United States Patent
Kimball (10) Patent No.: US 7,355,650 B2
(45) Date of Patent: Apr. 8, 2008

(54) UPCONVERSION WITH IMPROVED DIAGONAL ENHANCEMENT

(75) Inventor: John Kimball, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 550 days.

(21) Appl. No.: 10/509,047

(22) PCT Filed: Mar. 19, 2003

(86) PCT No.: PCT/US03/08353

§ 371 (c)(1),
(2), (4) Date: Sep. 24, 2004

(87) PCT Pub. No.: WO03/084110

PCT Pub. Date: Oct. 9, 2003

(65) Prior Publication Data

US 2005/0168631 A1 Aug. 4, 2005

Related U.S. Application Data (60) Provisional application No. 60/367,794, filed on Mar. 27, 2002.

(51) Int. Cl.
*H04N 7/01* (2006.01)
*H04N 11/20* (2006.01)

(52) U.S. Cl. .................................. 348/448; 348/458

(58) Field of Classification Search ........ 348/448–452, 348/458, 441
See application file for complete search history.

(56) References Cited

U.S. PATENT DOCUMENTS

| | | | |
|---|---|---|---|
| 4,967,263 A | 10/1990 | Dieterich | |
| 5,046,164 A | 9/1991 | Hurst | |
| 5,093,721 A | 3/1992 | Rabii | |
| 5,128,747 A | 7/1992 | Isnardi et al. | |
| 5,339,109 A * | 8/1994 | Hong | 348/441 |
| 5,347,599 A | 9/1994 | Yamashita et al. | |
| 5,386,237 A | 1/1995 | Knee | |
| 5,467,145 A | 11/1995 | Limberg | |

(Continued)

FOREIGN PATENT DOCUMENTS

WO   WO 03084110   10/2003

OTHER PUBLICATIONS

Search Report Dated Aug. 8, 2003.

(Continued)

*Primary Examiner*—M. Lee
(74) *Attorney, Agent, or Firm*—Joseph J. Lake; Harvey D. Fried (57) ABSTRACT

Interlaced video upconverted to progressive video has improved diagonal enhancement. A plurality of averages and differences are determined from different pixels near a given output pixel, including: a vertical average, first and second left diagonal averages, first and second right diagonal averages, a vertical difference, first and second left diagonal differences, and first and second right diagonal differences. A selection is made among the averages based on an absolute value of a minimal difference among the differences. The selection is constrained to select the vertical average if the differences among the averages are ambiguous, that is, when a value for the given output pixel is not within a range of values defined by pixels vertically adjacent to the given output pixel or when a minimal difference among the respective differences is not unique.

20 Claims, 5 Drawing Sheets

U.S. PATENT DOCUMENTS

| | | | |
|---|---|---|---|
| 5,481,311 A * | 1/1996 | Boie | 348/448 |
| 5,663,771 A | 9/1997 | Raby | |
| 5,742,348 A | 4/1998 | Kuwahara et al. | |
| 5,796,437 A | 8/1998 | Muraji et al. | |
| 6,037,990 A | 3/2000 | Ogawa et al. | |
| 6,295,091 B1 | 9/2001 | Huang | |
| 6,384,873 B1 | 5/2002 | Rumreich et al. | |
| 6,421,090 B1 | 7/2002 | Jiang et al. | |
| 6,452,639 B1 | 9/2002 | Wagner et al. | |
| 6,515,706 B1 | 2/2003 | Thompson et al. | |
| 6,573,941 B1 | 6/2003 | Willis et al. | |
| 6,650,790 B1 | 11/2003 | Arbeiter et al. | |
| 6,992,725 B2 | 1/2006 | Mohsenian | |
| 7,116,372 B2 | 10/2006 | Kondo et al. | |

OTHER PUBLICATIONS

European Search Report Dated Feb. 28, 2007.

* cited by examiner

UPCONVERSION WITH IMPROVED DIAGONAL ENHANCEMENT

This application claims the benefit, under 35 U.S.C. § 365 of International Application PCT/US03/08353, filed Mar. 19, 2003, which was published in accordance with PCT Article 21(2) on Oct. 9, 2003 in English and which claims the benefit of United States Provisional patent application No. 60/367,794, filed March 27, 2002.

BACKGROUND OF THE INVENTION

Technical Field

This invention relates to the field of upconverting interlaced video to progressive (non-interlaced) video. More particularly, this relates to the field of deinterlacing algorithms.

The basic idea of selecting between two diagonal averages and a vertical average has probably been used by many others previously and was explored by the Sarnoff Research Laboratories (Sarnoff) in a research project funded by Thomson (assignee herein) in the early 1990's.

A simple method of deinterlacing a field of luminance pixels to create lines of pixels that are spatially in between the existing lines of the field is to average the values of the pixel directly above and below to create each output pixel. This method produces jagged edges on diagonal details in the field such as on steps that are not horizontal or the on edges of the stripes on a flag as it waves in the wind and the angles vary.

A better method for enhanced diagonal detail, chooses between three pixel averages: the vertical average previously described and a left and right diagonal average. The left diagonal average is computed by averaging the value of the pixel to the left and above the position being interpolated with the pixel to the right and below. Likewise, the right diagonal is the average of the pixel to the right and above the position being interpolated with the pixel to the left and below.

The basic idea of selecting between two diagonal averages and a vertical average was explored by the Sarnoff Research Laboratories (Sarnoff) in a research project funded by Thomson (assignee herein) in the early 1990's. The simplest algorithm choosing between the three choices evaluated by Sarnoff was denoted in their report as the DIAG1 algorithm. Other algorithms that Sarnoff explored and simulated to attempt to solve the noisy decision problem were denoted DIAG3, DIAG3W, DIAG3WW. DIAG3 uses a more complicated decision algorithm than DIAG1. DIAG3W adds a noise constraint to the DIAG3 algorithm.

The DIAG1 algorithm for selecting between two diagonal averages and a vertical average computes and compares three differences using the same pixel values as the averages. For each average, the corresponding difference is computed and the absolute values of those differences are compared to find a minimum. The pixel average that corresponds to the minimum difference is selected to be the interpolated value.

The Sarnoff work mentioned is documented in two reports: *Spatially-Adaptive De-Interlacing Techniques for Digital Feature TV*, Dec. 31, 1990 and *Digital Feature TV Project Final Report*, Mar. 31, 1991.

Even with the use of having multiple choices to consider for a spatial interpolation estimate, the existing algorithm is unable to enhance picture quality for lower angle diagonals. There is a long-felt need for an improved algorithm that is effective for lower angle diagonals.

SUMMARY OF THE INVENTION

A more accurate spatial estimate can be obtained by evaluating nearby diagonals. Adding a noise constraint to the decision process of selecting between two diagonal averages and the vertical average advantageously improves the picture quality in the areas where diagonal detail exists. A constraint can advantageously be imposed that causes the algorithm to prefer the vertical average in ambiguous cases.

This approach is described in a corresponding application filed concurrently herewith and denoted as the DIAG1T algorithm. A pair of constraints is advantageously applied to the DIAG1 average selection algorithm. Firstly, if the minimum difference is not unique, the vertical average is selected. Secondly, if the selected average does not lie in the range of values between the pixel above and the pixel below the position being interpolated, then the vertical average is selected. The resulting diagonal adjacent pixels line-up at angles in the displayed picture that correspond to or depend upon the sample rate. For a 720×480 picture with 4×3 aspect ratio, for example, the corrected diagonals correspond to angles as shallow as about 41 degrees above horizontal. The DIAG1T algorithm can only improve diagonal features in the picture that are steeper than that angle. Nevertheless, the DIAG1T provides a significant improvement in picture quality in a manner that is relatively simple to implement and which can be implemented at a comparatively low cost.

The present application is directed to a method that, although more complex than DIAG1T, improves diagonal enhancement at significantly shallower angles than DIAG1T. The second left and second right diagonal averages are also included as choices in a multiple selection process, resulting in this case in a five-way selection process denoted as the DIAG5T algorithm. The second left diagonal average can be the average between the value of the pixel two pixels to the left and above the position being interpolated and the pixel two pixels to the right and below the pixel position being interpolated. The second right diagonal can be the average of the pixel two pixels to the right and above the pixel position being interpolated and the pixel two pixels to the left and below the pixel position being interpolated.

The DIAG5T algorithm chooses between these five choices as follows. Firstly, the algorithm chooses between the first left diagonal and the second left diagonal by comparing the associated differences. The diagonal with the minimum difference is preferably selected with the first diagonal being preferred if the differences are equal. Secondly, and similarly to the first step, the algorithm chooses between the first right diagonal and the second right diagonal in a similar fashion. Thirdly, the algorithm's selection for the interpolated value is chosen from the three choices of the selected left diagonal, the vertical average and the selected right diagonal, using the same logic as the DIAG1T algorithm, with the selected diagonal averages and differences replacing the diagonal averages and differences referenced in DIAG1T.

In a 720×480 picture with 4×3 aspect ratio, for example, the corrected diagonals correspond to angles of about 24 degrees above horizontal which improves upon the range of angles that the DIAG1T can affect. Diagonal details in the picture with angles greater than this angle (24 degrees) can be advantageously improved with the DIAG5T algorithm.

DETAILED DESCRIPTION OF THE PREFERRED EMBODIMENTS

The DIAG5T deinterlacing algorithm can be used as a spatial only (intra-field) algorithm or as a spatial estimate in a motion adaptive deinterlacing algorithm. The DIAG5T incorporates certain elements of the DIAG1 and the DIAG1T algorithms, and accordingly, these will be explained first.

Figure 2:
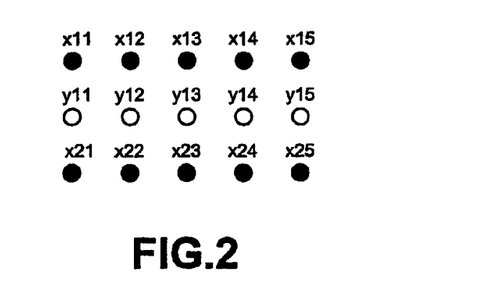
FIG. 2 is a diagram useful for explaining the spatial orientation of original and interpolated pixels.

Let the luminance pixel values on two consecutive lines of input video be labeled $X_{ij}$ and the interpolated progressive output line pixels be labeled $Y_{ij}$ as follows, and as shown in FIG. 2:

Input line 1: X11 X12 X13 X14 X15
Output line: Y11 Y12 Y13 Y14 Y15
Input line 2: X21 X22 X23 X24 X25

A simple line average spatial estimate would be:

$$Y1j = (X1j + X2j)/2.$$

The description of the DIAG1T algorithm given below will focus on computing the spatial estimate for the output position Y13. For other output pixels, the pixel indices in the description would be adjusted accordingly. An implementation of the algorithm can choose to modify the processing described herein at the beginnings and ends of lines when required input pixels are not available.

Figure 1:
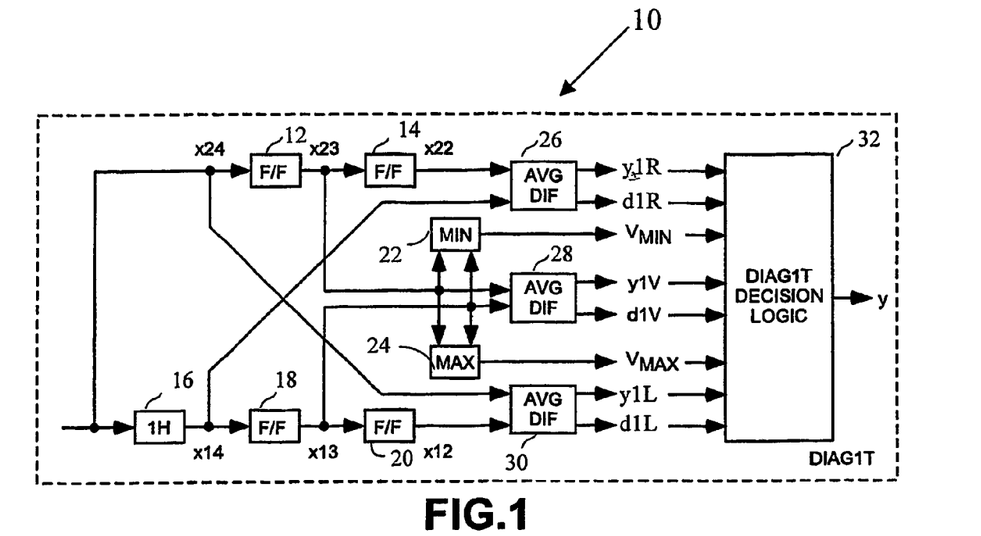
FIG. 1 is a block diagram of the DIAG1T diagonal enhancement upconversion system.

For Y13, the DIAG1T algorithm computes 3 pixel averages and 3 pixel differences as follows, and as shown in FIG. 1:

| | |
|---|---|
| y1L = (X12 + X24)/2; | d1L = abs(X12 − X24); |
| y1V = (X13 + X23)/2; | d1V = abs(X13 − X23); |
| y1R = (X14 + X22)/2; | d1R = abs(X14 − X22); |

Figure 3:
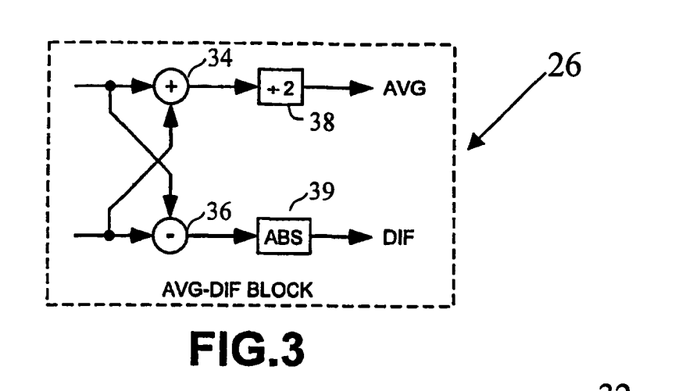
FIG. 3 is a block diagram illustrating the details of the Averaging and Difference (AVG-DIF) blocks in FIG. 1.

These averages and differences correspond to a left diagonal, a vertical and a right diagonal estimate. An exemplary block diagram of a circuit 10 for providing all these averages and differences is shown in FIG. 1 including a plurality of delay circuits 12, 14, 16, 18, and 20 in the form of flip flops and other suitable devices. For example, delay circuit 16 can be a line delay. The circuit further includes minimum circuit 22, maximum circuit 24, as well as AVG-DIFF blocks 26, 28 and 30. The details of an exemplary AVG-DIF block such as the AVG-DIF block 26 in FIG. 1 is shown in FIG. 3. AVG-DIF block 26 preferably includes in an averaging portion of the device or block, a summer 34 for adding pixel values and a divide-by-two circuit 38. In a difference portion, block 26 further includes a subtractor 26 and an absolute value function 39.

Figure 5:
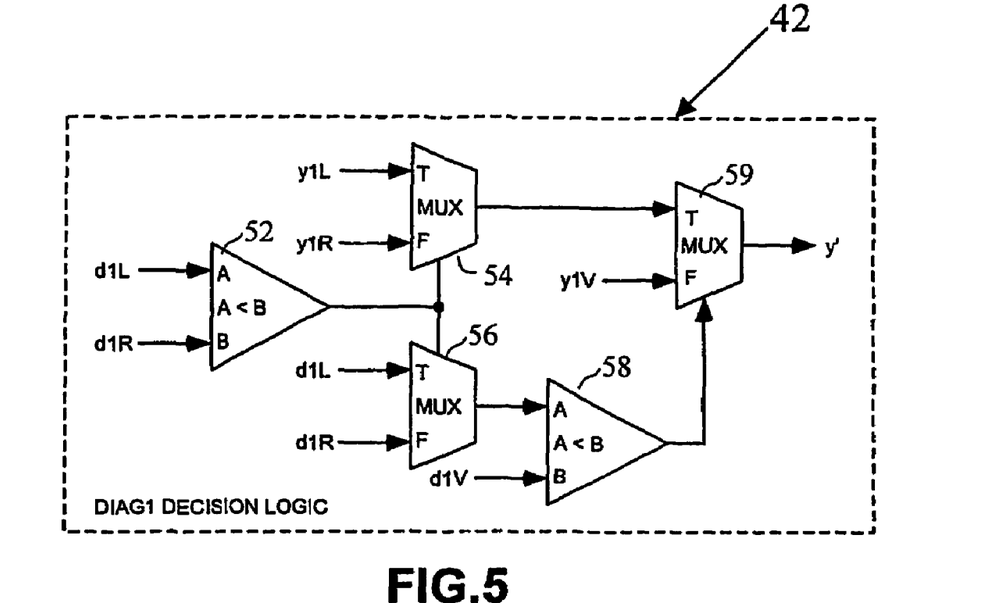
FIG. 5 is a block diagram of the DIAG1 decision logic shown in FIG. 4.

The basic DIAG1 algorithm chooses the estimate that corresponds to the minimum difference as follows, and as shown in FIG. 5:

Y=y1V; d=d1V;

if(d1L<d) {y=y1L; d=d1L;} if(d1R<d) y=y1R;

Y13=y;

More specifically, the basic DIAG1 decision logic 42 can be represented using comparators 52 and 58 and multiplexers 54, 56 and 59 coupled as shown in FIG. 5 to provide the functionality of the DIAG1 algorithm described above, although the present invention is not limited thereto. Note that the DIAG1 algorithm or DIAG1 decision logic 42 forms a part of the overall DIAG1T decision logic 32 shown in FIGS. 1 and 4.

Figure 4:
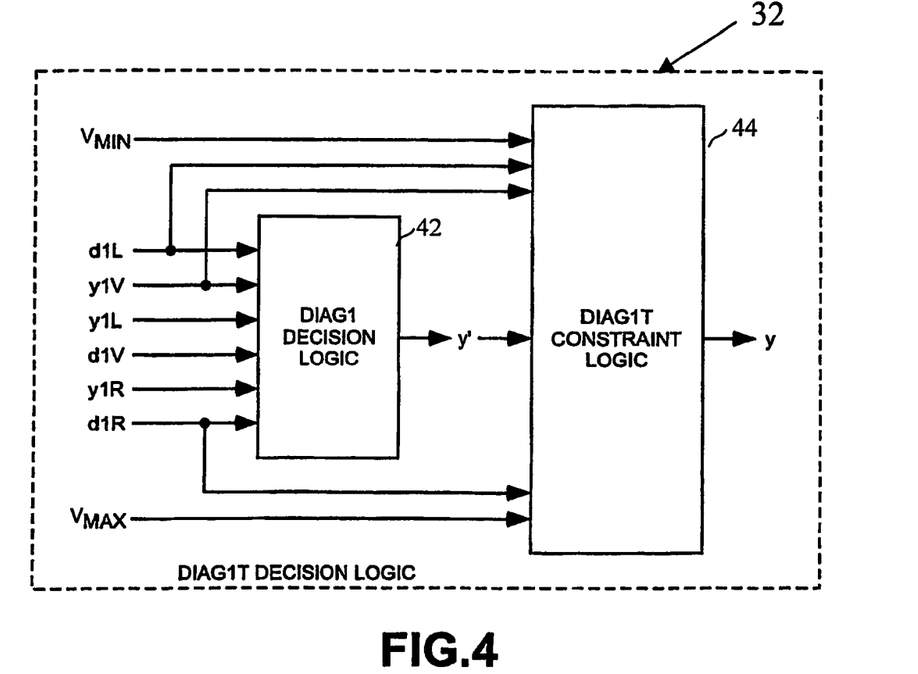
FIG. 4 is a block diagram illustrating the signal flow in the DIAG1T circuit shown in FIG. 1.
Figure 6:
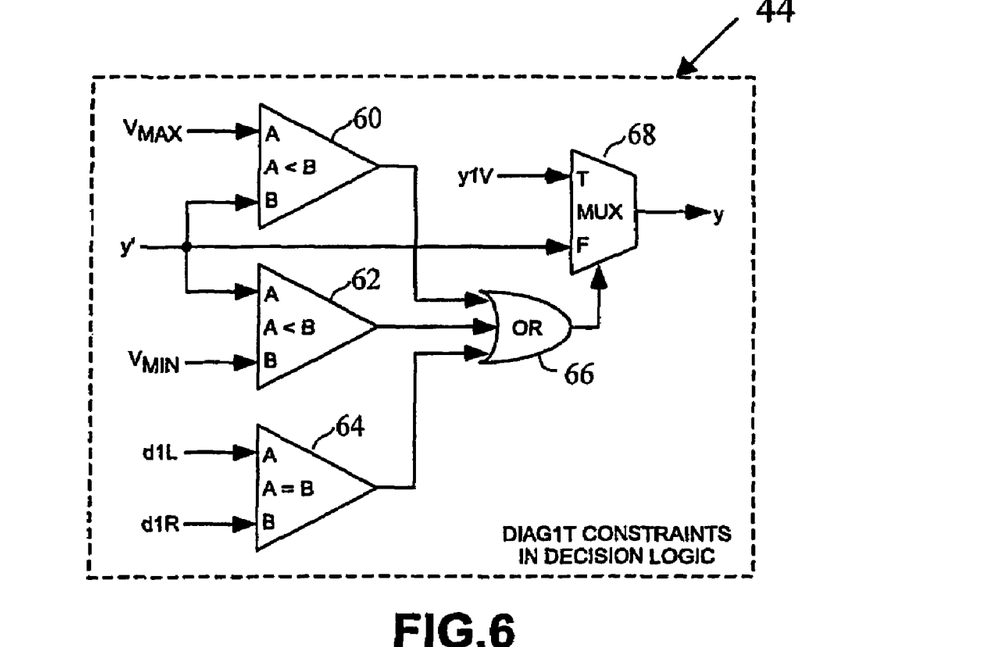
FIG. 6 is a block diagram illustrating the DIAG1T constraint logic in FIG. 4.

The noise constraint or the DIAG1T constraint logic 44 shown in FIGS. 4 and 6 that is used to clean up decision noise in DIAG1, and in so doing distinguish DIAG1T over DIAG1, further insists that a value for the given output pixel (Y13) fall within a range of values of a top pixel and a bottom pixel defining the vertical average for the given output pixel. In terms of equations, this means that either:

$$X13 \leq Y13 \leq X23 \text{ or } X13 \geq Y13 \geq X23$$

If this constraint is not satisfied, then output Y13=y1V.

An additional constraint distinguishing DIAG1T is that the left diagonal difference either equals or substantially equals the right diagonal difference. In other words, the left diagonal difference and the right diagonal difference need to be unique. In terms of equations:

if d1L=d1R, then output Y13=y1V.

These further constraints are illustrated in FIGS. 4 and 6. In particular, the DIAG1T constraint logic 44 shown in FIG. 6 can be embodied by comparators 60, 62, and 64, OR gate 66 and multiplexer 68 arranged and coupled as shown to provide the functions described above.

The DIAG5T algorithm uses much of the circuits and methods of the DIAG1T algorithm. It is assumed that the video signal is in component form and that only the luminance component is processed with the DIAG5T algorithm. A simple line average is satisfactory for deinterlacing the two lower resolution chrominance components.

Figure 7:
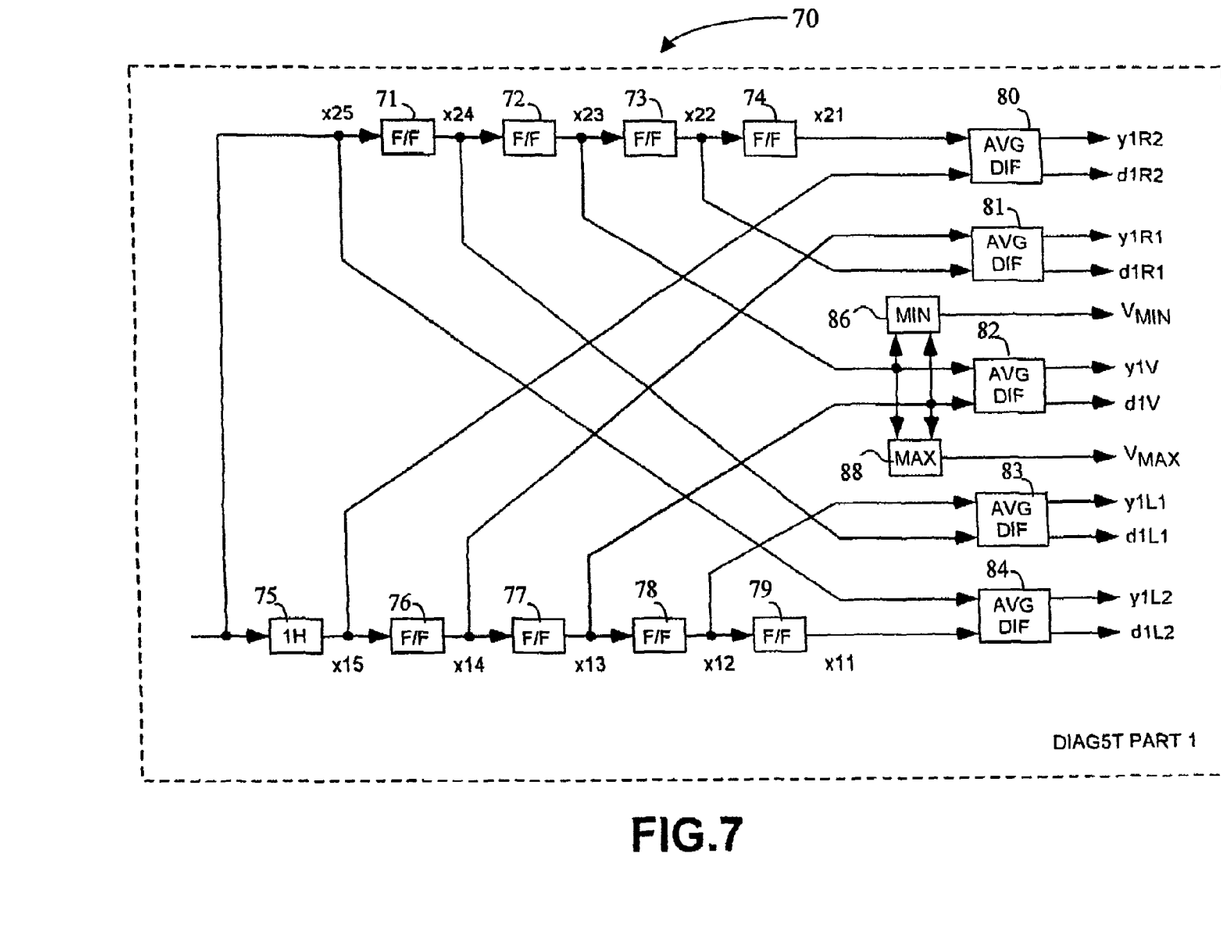
FIG. 7 is a block diagram of the first part of the DIAG5T diagonal enhancement upconversion system in accordance with the present invention.

For Y13, the DIAG5T algorithm computes 5 pixel averages and 5 pixel differences as follows, and as shown in FIG. 7 (part 1 of DIAG5T):

| | |
|---|---|
| y1L2 = (X11 + X25)/2; | d1L2 = abs(X11 − X25); |
| y1L1 = (X12 + X24)/2; | d1L1 = abs(X12 − X24); |
| y1V = (X13 + X23)/2; | d1V = abs(X13 − X23); |
| y1R1 = (X14 + X22)/2; | d1R1 = abs(X14 − X22); |
| y1R2 = (X15 + X21)/2; | d1R2 = abs(X15 − X21); |

These averages and differences correspond to a second and first left diagonal, a vertical and a first and second right diagonal estimate. An exemplary block diagram of a circuit 70 for providing all these averages and differences is shown in FIG. 7 including a plurality of delay circuits 71, 72, 73, 74, 75, 76, 77, 78, and 79 in the form of flip flops and other suitable devices. For example, delay circuit 75 can be a line delay. The circuit further includes minimum circuit 86, maximum circuit 88, as well as AVG-DIFF blocks 80, 81, 82, 83 and 84. The details of an exemplary AVG-DIF block used in circuit 70 would be similar to the AVG-DIF block 26 shown in FIGS. 1 and 3.

Figure 8:
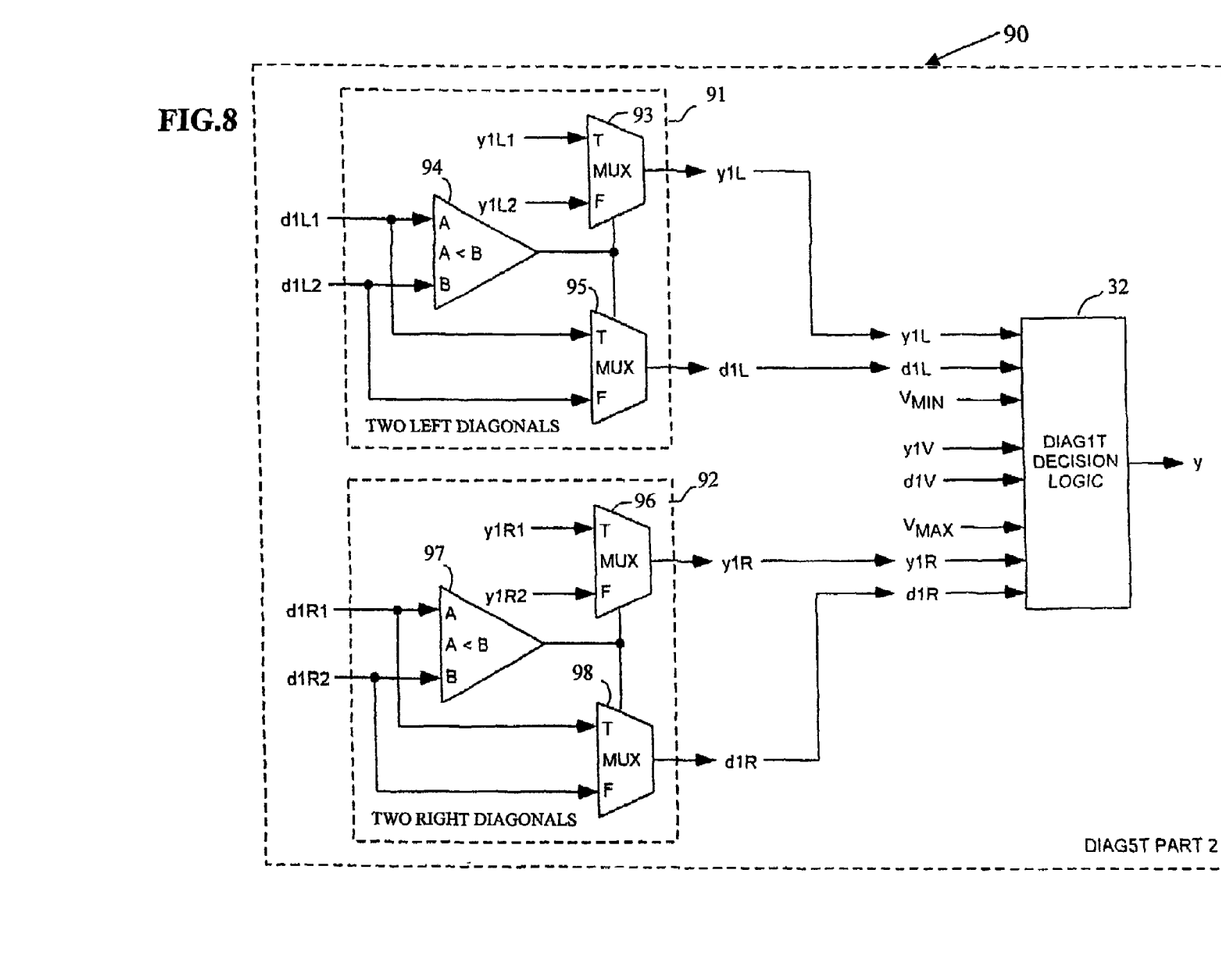
FIG. 8 is a block diagram of the second part of the DIAG5T vertical enhancement upconversion system in accordance with the present invention.

First, the DIAG5T algorithm selects one of the left diagonals and one of the right diagonals as follows, and as shown in FIG. 8.

The left diagonal selection is:

if(d1L2<d1L) {y1L=y1L2; d1L=d1L2;} else y1L=y1L1; d1L=d1L1

The right diagonal selection is:

if(d1R2<d1R) {y1R=y1R2; d1R=d1R2;} else y1R=y1R1; d1R=d1R1

In particular, the DIAG5T diagonal selection logic 90 shown in FIG. 8 can be embodied by comparators 94 and 97, multiplexers 93, 95, 96 and 98 feeding their respective outputs to the DIAG1T decision logic 32 as shown in FIG. 4, and further arranged and coupled as shown to provide the functions described above. Note that circuit 91 comprises comparator 94 and multiplexers 93 and 95 for processing the left and second left diagonal averages and differences and circuit 92 comprises comparator 97 and multiplexers 96 and 98 for processing the right and second right diagonal averages and differences.

The DIAG5T algorithm then uses the resulting 3 averages and differences (y1L, y1V, y1R, d1L, d1V, d1R), using the same process as the DIAG1T algorithm, first selecting an average as follows:

Y=y1V; d=d1V;

if(d1L<d) {y=y1L; d=d1L;} if(d1R<d) y=y1R;

Y13=y; Then checking the following constraints, as in the DIAG1T algorithm, DIAG5T insists that either:

X13<Y13<X23 or X13>Y13>X23

If this constraint is not satisfied, then output Y13 is set to y1V. An additional constraint enforced is that:

if d1L and d1R are equal, then output Y13 is set to y1V.

FIG. 8 illustrates the second part of the DIAG5T algorithm, receiving inputs from part 1 in FIG. 7. A logic block for processing the two left diagonals generates y1L and d1L from y1L1, y1L2, d1L1 and d1L2. A logic block for processing the two right diagonals generates y1R and d1R from y1R1, y1R2, d1R1 and d1R2. The output of these logic blocks and the $V_{MIN}$, y1V, d1V and $V_{MAX}$ outputs of FIG. 7 are inputs to decision logic corresponding to the DIAG1T algorithm to generate the interpolated output pixel y. The DIAG5T algorithm includes a selection step that constrains the result (y) to the vertical average if the differences among the averages are ambiguous. Note that in the DIAG5T algorithm, the two left diagonal averages can be equal or "ambiguous" (y1L1=y1L2) and the two right diagonal averages can be equal or "ambiguous" (y1R1=y1R2), yet it is the final DIAG1T constraint of the DIAG5T algorithm that constrains the interpolated value to the vertical average if the selected left diagonal and the selected right diagonal are ambiguous or equal or not unique (y1L=y1R). Thus, as shown above, among the original 5 averages, the minimum may not necessarily be unique. Thomson's Princeton Engine real time digital video simulator was programmed to demonstrate the DIAG5T algorithm. In demos with frozen or moving video, areas with diagonal detail are visibly improved. One such scene observed had an American flag waving in the wind. The stripes on the flag change from horizontal to various angles of diagonal as the flag moved in the wind. The improvement of jagged edges on some of the diagonal angles was significant. The DIAG5T algorithm is able to improve the edge between stripes of the flag at significantly shallower angles to horizontal than, for example, the DIAG1T algorithm. The improvement of DIAG5T over DIAG1T is approximately 50% greater than the improvement of DIAG1T over a simple vertical average.

When used as the spatial estimate of a motion adaptive algorithm, the DIAG5T algorithm substantially improves moving areas of the picture. Stationary regions of the picture already have superior detail from adjacent fields of the video. Moreover, in a 720×480 picture with 4×3 aspect ratio, The DIAG5T algorithm provides enhancement for diagonals corresponding to angles as shallow as about 24 degrees above horizontal and steeper.

In light of the foregoing description of the invention, it should be recognized that the present invention can be realized in hardware, software, or a combination of hardware and software. A method of interpolating a given output pixel value when upconverting interlaced video to progressive video according to the present invention can be realized in a centralized fashion in one processing system, or in a distributed fashion where different elements are spread across several interconnected systems. Any kind of computer system, or other apparatus adapted for carrying out the methods described herein, is suited. A typical combination of hardware and software could be a general purpose computer processor or digital signal processor with a computer program that, when being loaded and executed, controls the computer system such that it carries out the methods described herein.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Additionally, the description above is intended by way of example only and is not intended to limit the present invention in any way, except as set forth in the following claims.

The invention claimed is:

1. A method for upconverting interlaced video to progressive video with an improved diagonal enhancement, comprising the steps of:

determining, from different pixels near a given output pixel, a plurality of averages and differences, including: a vertical average, a first left diagonal average, a second left diagonal average, a first right diagonal average, a second right diagonal average, a vertical difference, a first left diagonal difference, a second left diagonal difference, a first right diagonal difference, and a second right diagonal difference;

selecting among the averages based on an absolute value of a minimal difference among the differences; and, constraining the selecting step to the vertical average if the differences among the averages are ambiguous.

2. The method of claim 1, wherein the step of selecting among the averages comprises the steps of selecting between the first left diagonal average and the second left diagonal average to provide a selected left diagonal average and selecting between the first right diagonal average and the second right diagonal average to provide a selected right diagonal average based on the minimal difference among the differences.

3. The method of claim 2, wherein the step of selecting further comprises the step of selecting among the selected left diagonal average, the selected right diagonal average and the vertical average, based on the minimal difference among the respective differences.

4. The method of claim 2, wherein the step of selecting further comprises the steps of selecting the first left diagonal average when the first left diagonal average and the second left diagonal average are equal and selecting the first right diagonal average when the first right diagonal average and the second right diagonal average are equal.

5. The method of claim 1, wherein the vertical average is obtained by adding a luminance component value of a vertically adjacent pixel above the given output pixel with a luminance component value of a vertically adjacent pixel below the given output pixel to form a sum which is divided by two.

6. The method of claim 1, wherein the left diagonal average is obtained by adding a luminance component value of a diagonally adjacent pixel above and to the left of the given output pixel with a luminance component value of a diagonally adjacent pixel below and to the right of the given output pixel to form a sum which is divided by two and wherein the right diagonal average is obtained by adding a luminance component value of a diagonally adjacent pixel above and to the right of the given output pixel with a luminance component value of a diagonally adjacent pixel below and to the left of the given output pixel to form a sum which is divided by two.

7. The method of claim 1, wherein the second left diagonal average is obtained by averaging the value of the pixel two pixels to the left and above the given output pixel with the value of the pixel two pixels to the right and below the given output pixel.

8. The method of claim 1, wherein the second right diagonal average is obtained by averaging the value of the pixel two pixels to the right and above the given output pixel with the value of the pixel two pixels to the left and below the given output pixel.

9. The method of claim 1, wherein the step of constraining comprises constraining the selection step to the vertical average if a value for the given output pixel fails to fall within a range of values defined by an adjacent pixel above the given output pixel and an adjacent pixel below the given output pixel.

10. The method of claim 2, wherein the step of constraining comprises constraining the selection step to the vertical average if a corresponding difference for the selected left diagonal average substantially equals a corresponding difference for the selected right diagonal average.

11. The method of claim 1, wherein:
the vertical average is based on pixels vertically adjacent to the given output pixel;
the first left diagonal average is based on upper left and lower right diagonally adjacent pixels;
the first right diagonal average is based on upper right and lower left diagonally adjacent pixels;
the second left diagonal average is based on two pixels to the left and above the given output pixel and two pixels to the right and below the given output pixel; and,
the second right diagonal average is based on two pixels to the right and above the given output pixel and two pixels to the left and below the given output pixel.

12. The method of claim 11, wherein the step of selecting comprises the steps of:
selecting the first left diagonal average and the second left diagonal average to provide a selected left diagonal average; and,
selecting between the first right diagonal average and the second right diagonal average to provide a selected right diagonal average based on the minimal difference.

13. The method of claim 12, wherein the step of selecting further comprises the step of selecting among the selected left diagonal average, the selected right diagonal average, and the vertical average based on the minimal difference among the respective differences.

14. The method of claim 12, wherein the step of selecting further comprises the steps of:
selecting the left diagonal average when the left diagonal average and the second left diagonal average are equal; and,
selecting the right diagonal average when the right diagonal average and the second right diagonal average are equal.

15. A deinterlacing circuit for upconverting interlaced video to progressive video, comprising:
means for determining, from different pixels near a given output pixel, a plurality of averages and differences, including: a vertical average, a first left diagonal average diagonal average, a first right diagonal average, a second right diagonal average, a vertical difference, a first left diagonal difference, a second left diagonal difference, a first right diagonal difference, and a second right diagonal difference;
means for selecting among the averages based on an absolute value of a minimal difference among the differences; and,
means for constraining the selecting step to the vertical average if the differences among the averages are ambiguous.

16. The deinterlacing circuit of claim 15, wherein the minimal difference is ambiguous when:
a value for the given output pixel fails to be within a range of values defined by an adjacent pixel above the given output pixel and an adjacent pixel below the given output pixel; or,
the minimal difference among the respective differences fails to be unique.

17. The deinterlacing circuit of claim 15, wherein:
the vertical average is determined from pixels vertically adjacent to the given output pixel;
the first left diagonal average is determined from upper left and lower right diagonally adjacent pixels;
the first right diagonal average is determined from upper right and lower left diagonally adjacent pixels;
the second left diagonal average is determined from two pixels to the left and above the given output pixel and two pixels to the right and below the given output pixel; and,
the second right diagonal average is determined from two pixels to the right and above the given output pixel and two pixels to the left and below the given output pixel.

18. The deinterlacing circuit of claim 15, wherein the selecting means comprises:
left diagonal selecting means for selecting between the first left diagonal average and the second left diagonal average to provide a selected left diagonal average; and,
right diagonal selecting means for selecting between the first right diagonal average and the second right diagonal average to provide a selected right diagonal average based on the minimal difference.

19. The deinterlacing circuit of claim 18, wherein the selecting means comprises output selecting means for selecting among the selected left diagonal average, the selected right diagonal average, and the vertical average based on the minimal difference among the respective differences.

20. The deinterlacing circuit of claim 18, wherein:
the left diagonal selecting means selects the first left diagonal average when the left diagonal average and the second left diagonal average are equal; and,
the right diagonal selecting means selects the first right diagonal average when
the right diagonal average and the second right diagonal average are equal.

* * * * *